(12) United States Patent
Kimura et al.

(10) Patent No.: US 8,952,086 B2
(45) Date of Patent: Feb. 10, 2015

(54) POLYOLEFIN RUBBER COMPOSITION HAVING SURFACE LUBRICITY

(71) Applicant: Shin-Etsu Chemical Co., Ltd., Tokyo (JP)

(72) Inventors: Tsuneo Kimura, Annaka (JP);
Masayuki Yoshida, Annaka (JP);
Masaki Tanaka, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/097,438

(22) Filed: Dec. 5, 2013

(65) Prior Publication Data

US 2014/0200297 A1 Jul. 17, 2014

(30) Foreign Application Priority Data

Jan. 16, 2013 (JP) ................. 2013-005335

(51) Int. Cl.
*C08L 19/00* (2006.01)
*B60S 1/40* (2006.01)
*C08F 8/00* (2006.01)
*C08L 23/26* (2006.01)

(52) U.S. Cl.
CPC .. *C08F 8/00* (2013.01); *C08L 23/26* (2013.01)
USPC ..................... 524/269; 15/250.001

(58) Field of Classification Search
None
See application file for complete search history.

(56) References Cited

U.S. PATENT DOCUMENTS

| 4,150,010 | A | 4/1979 | Itoh et al. | |
|---|---|---|---|---|
| 4,151,156 | A | 4/1979 | Itoh et al. | |
| 4,201,698 | A | 5/1980 | Itoh et al. | |
| 4,376,184 | A | 3/1983 | Itoh et al. | |
| 6,864,315 | B1 * | 3/2005 | Hakuta et al. | 525/105 |
| 2003/0236425 | A1 * | 12/2003 | Herr et al. | 556/443 |
| 2005/0282959 | A1 * | 12/2005 | Ahn et al. | 524/861 |
| 2006/0199910 | A1 * | 9/2006 | Walton et al. | 525/192 |
| 2007/0077375 | A1 * | 4/2007 | Honda et al. | 428/31 |
| 2007/0122570 | A1 * | 5/2007 | Honda et al. | 428/31 |
| 2008/0182939 | A1 * | 7/2008 | Morikawa et al. | 525/221 |

FOREIGN PATENT DOCUMENTS

| JP | 55-30741 | B2 | 8/1980 |
|---|---|---|---|
| JP | 55-39248 | B2 | 10/1980 |
| JP | 55-39261 | B2 | 10/1980 |
| JP | 57-17011 | B2 | 4/1982 |
| JP | 58-13093 | B2 | 3/1983 |
| JP | 2002-293975 | A | 10/2002 |
| JP | 4949680 | B2 | 6/2012 |

* cited by examiner

*Primary Examiner* — Robert S Loewe
(74) *Attorney, Agent, or Firm* — Birch, Stewart, Kolasch & Birch, LLP

(57) ABSTRACT

A polyolefin rubber composition comprising (A) an ethylene/α-olefin/nonconjugated polyene random copolymer, (B) an organohydrogenpolysiloxane containing on average from 1 to less than 2 Si—H groups in a molecule, and (C) an addition reaction catalyst can be compression molded or steam vulcanized into a cured product having heat resistance and surface lubricity. The cured product is especially suited as weatherstrips and windshield wiper blades.

10 Claims, No Drawings

POLYOLEFIN RUBBER COMPOSITION HAVING SURFACE LUBRICITY

CROSS-REFERENCE TO RELATED APPLICATION

This non-provisional application claims priority under 35 U.S.C. §119(a) on Patent Application No. 2013-005335 filed in Japan on Jan. 16, 2013, the entire contents of which are hereby incorporated by reference.

TECHNICAL FIELD

This invention relates to a polyolefin rubber composition which can be compression molded or steam vulcanized into a cured product exhibiting heat resistance and surface lubricity and useful as automotive weatherstrips and windshield wiper blades.

BACKGROUND ART

Generally, synthetic polyolefin rubber is widely applied as electrical insulators, radiator hoses, weatherstrips, and windshield wiper blades because of its excellent electrical and mechanical properties.

Patent Documents 1 to 5 disclose the addition of organopolysiloxanes to synthetic polyolefin rubbers. Since the purpose of adding organopolysiloxanes is to improve heat resistance, they refer nowhere to surface lubricity or slipperiness.

Patent Documents 6 and 7 disclose the addition of organohydrogensiloxane and platinum catalyst to synthetic polyolefin rubber. Since the organohydrogensiloxane is used as a crosslinker for synthetic polyolefin rubber, it must contain at least two Si—H groups per molecule.

Most prior art methods for imparting lubricity to the surface of synthetic polyolefin rubber require post-treatments of the cured synthetic rubber surface such as coating of solvent-dilution or emulsion type silicone compositions. Such post-treatments are disadvantageous in productivity, safety, and cost.

CITATION LIST

Patent Document 1: JP-B S55-30741 (U.S. Pat. No. 4,150,010)
Patent Document 2: JP-B S55-39248
Patent Document 3: JP-B S55-39261 (U.S. Pat. No. 4,151,156)
Patent Document 4: JP-B S57-17011 (U.S. Pat. No. 4,201,698)
Patent Document 5: JP-B S58-13093 (U.S. Pat. No. 4,376,184)
Patent Document 6: JP-A 2002-293975
Patent Document 7: JP 4949680

DISCLOSURE OF INVENTION

An object of the invention is to provide a polyolefin rubber composition which can be compression molded or steam vulcanized into a cured product having both heat resistance and surface lubricity.

The inventors have found that a cured product exhibiting good surface lubricity is obtained by addition reacting organohydrogensiloxane having less than 2 (i.e., from 1 to less than 2 on average) Si—H groups with aliphatic unsaturated groups of an ethylene/propylene/nonconjugated polyene random copolymer (for example, an aliphatic unsaturated group-containing copolymer selected from an ethylene/propylene/5-vinyl-2-norbornene copolymer and ethylene/propylene/ethylidene norbornene copolymer) in the presence of a platinum catalyst and vulcanizing the resulting siloxane-modified ethylene/propylene/nonconjugated polyene random copolymer.

In one aspect, the invention provides a polyolefin rubber composition comprising
(A) an ethylene/α-olefin/nonconjugated polyene random copolymer,
(B) an organohydrogenpolysiloxane containing on average from 1 to less than 2 Si—H groups in a molecule, the organohydrogenpolysiloxane being present in such an amount as to provide 0.1 to 1 Si—H group per aliphatic unsaturated group in component (A), and
(C) a catalytic amount of an addition reaction catalyst.

In a preferred embodiment, the composition contains a siloxane-modified ethylene/α-olefin/nonconjugated polyene random copolymer which has been formed by intimately mixing the composition to effect hydrosilylation addition reaction between components (A) and (B).

Preferably, component (A) is at least one copolymer selected from ethylene/propylene/5-vinyl-2-norbornene copolymers and ethylene/propylene/ethylidene norbornene copolymers.

Also preferably, component (B) is at least one polysiloxane selected from organohydrogenpolysiloxanes of the general formulae (1) and (2):

$$HR_2Si\text{—}O\text{—}(R_2SiO)_x\text{—}SiR_3 \tag{1}$$

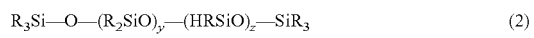
$$R_3Si\text{—}O\text{—}(R_2SiO)_y\text{—}(HRSiO)_z\text{—}SiR_3 \tag{2}$$

wherein R is each independently a monovalent aliphatic saturated hydrocarbon group of 1 to 20 carbon atoms or aryl group of 6 to 20 carbon atoms, x and y each are a positive number of at least 1, and z is a positive number from 1 to less than 2.

Typically, component (C) is a platinum group metal catalyst.

The composition may further comprise (D) a vulcanizer which is selected from organic peroxides and sulfur.

In another aspect, the invention provides a cured polyolefin rubber obtained by curing the polyolefin rubber composition defined above. The cured rubber has a coefficient of dynamic friction of up to 0.3 on its surface.

A weatherstrip and windshield wiper blade made of the cured polyolefin rubber are also contemplated herein.

Advantageous Effects of Invention

The polyolefin rubber composition can be compression molded or steam vulcanized into a cured product having a good combination of heat resistance and surface lubricity. The cured product is especially suited as weatherstrips and windshield wiper blades.

Notably, the term "surface lubricity" may also be described as a slippery surface, a surface having lubricating effect, or a low friction coefficient surface.

DESCRIPTION OF EMBODIMENTS

Component A

Component (A) is an ethylene/α-olefin/nonconjugated polyene random copolymer rubber, specifically a random copolymer of ethylene, an α-olefin of 3 to 20 carbon atoms, and a nonconjugated polyene. The random copolymer has an aliphatic unsaturated group (specifically, terminal or internal alkenyl) originating from the nonconjugated polyene.

Examples of the α-olefin of 3 to 20 carbon atoms include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, and 12-ethyl-1-tetradecene. Of these, α-olefins of 3 to 10 carbon atoms are preferred, with propylene, 1-butene, 1-hexene, and 1-octene being more preferred. These α-olefins may be used alone or in admixture of two or more.

The nonconjugated polyene used herein is preferably an alkenyl-containing norbornene compound which has an alkenyl group (typically vinyl) at a molecular end or an alkenyl group at a non-terminal position of the molecular chain as an internal olefin, as represented by the general formula (3) or (4).

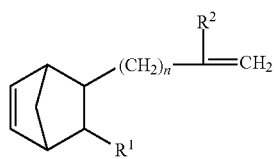

(3)

In formula (3), n is an integer of 0 to 10, and $R^1$ is hydrogen or an alkyl group of 1 to 10 carbon atoms. Examples of the $C_1$-$C_{10}$ alkyl group include methyl, ethyl, propyl, isopropyl, n-butyl, isobutyl, sec-butyl, t-butyl, n-pentyl, isopentyl, t-pentyl, neopentyl, hexyl, isohexyl, heptyl, octyl, nonyl, and decyl. $R^2$ is hydrogen or an alkyl group of 1 to 5 carbon atoms. Examples of the $C_1$-$C_5$ alkyl group include methyl, ethyl, propyl, isopropyl, n-butyl, isobutyl, sec-butyl, t-butyl, n-pentyl, isopentyl, t-pentyl, and neopentyl.

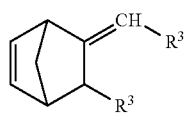

(4)

In formula (4), $R^3$ is each independently hydrogen or an alkyl group of 1 to 10 carbon atoms, preferably 1 to 5 carbon atoms. Examples of the alkyl group $R^3$ are as exemplified above for $R^1$.

Examples of the norbornene compounds represented by formulae (3) and (4) include 5-ethylidene-2-norbornene, 5-methylene-2-norbornene, 5-vinyl-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, and 5-(1,2,3-trimethyl-4-pentenyl)-2-norbornene. Of these, 5-vinyl-2-norbornene, 5-ethylidene-2-norbornene, 5-methylene-2-norbornene, 5-(2-propenyl)-2-norbornene, 5-(3-butenyl)-2-norbornene, 5-(4-pentenyl)-2-norbornene, 5-(5-hexenyl)-2-norbornene, 5-(6-heptenyl)-2-norbornene, and 5-(7-octenyl)-2-norbornene are preferred. These norbornene compounds may be used alone or in admixture of two or more.

In combination with the foregoing norbornene compounds such as 5-vinyl-2-norbornene and 5-ethylidene-2-norbornene, another nonconjugated polyene as shown below may be used as long as the desired properties intended herein are not compromised. Examples of the other nonconjugated polyene include chain-like nonconjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, and 7-methyl-1,6-octadiene; cyclic nonconjugated dienes such as methyltetrahydroindene, 5-methylene-2-norbornene, 5-isopropylidene-2-norbornene, 5-vinylidene-2-norbornene, 6-chloromethyl-5-isopropenyl-2-norbornene, and dicyclopentadiene; and trienes such as 2,3-diisopropylidene-5-norbornene, 2-ethylidene-3-isopropylidene-5-norbornene, and 2-propenyl-2,2-norbornadiene.

The ethylene/α-olefin/nonconjugated polyene random copolymer is preferably at least one copolymer selected from ethylene/propylene/5-vinyl-2-norbornene copolymers and ethylene/propylene/5-ethylidene-2-norbornene copolymers.

These ethylene/α-olefin/nonconjugated polyene random copolymers are commercially available. For example, ethylene/propylene/ethylidenenorbornene copolymers are available under the trade name of Keltan 2340A, Keltan 2650, Keltan 2450, and Keltan 2750 from Lanxess AG, and Vistalon 1703P from Exxon Mobil Corp. Ethylene/propylene/5-vinyl-2-norbornene copolymers are available under the trade name of PX-052H and PX-046H from Mitsui Chemicals, Inc.

Component B

Component (B) is an organohydrogenpolysiloxane which contains on average from 1 to less than 2 Si—H groups (i.e., silicon-bonded hydrogen) in a molecule and typically has a straight or branched molecular structure. Component (B) functions such that hydrosilylation addition reaction of Si—H groups with aliphatic unsaturated groups (typically alkenyl groups such as vinyl at molecular ends or internal or non-terminal positions of the molecular chain) in component (A) may take place in the presence of an addition reaction catalyst (C) to form a siloxane-modified product of component (A). An organohydrogenpolysiloxane containing on average 2 or more Si—H groups in a molecule is undesirable for the purpose of the invention because it functions as a crosslinker for component (A) so that the entire composition may cure, failing to form the siloxane-modified ethylene/α-olefin/nonconjugated polyene random copolymer. Component (B) should contain on average from 1 to less than 2 Si—H groups, preferably from 1 to less than 1.5 Si—H groups, and most preferably one Si—H group in a molecule.

The organohydrogenpolysiloxane is desirably one or more polysiloxanes selected from linear organohydrogenpolysiloxanes containing one Si—H group in a molecule as hydrogen bonded to silicon at one end of the molecular chain, represented by the general formula (1) and linear organohydrogenpolysiloxanes containing from 1 to less than 2 Si—H groups in a molecule as hydrogen bonded to silicon at a non-terminal or intermediate position of the molecular chain, represented by the general formula (2).

$$HR_2Si-O-(R_2SiO)_x-SiR_3 \quad (1)$$

$$R_3Si-O-(R_2SiO)_y-(HRSiO)_z-SiR_3 \quad (2)$$

Herein R is each independently a monovalent aliphatic saturated hydrocarbon group of 1 to 20 carbon atoms or aryl group of 6 to 20 carbon atoms. Examples include alkyl groups such as methyl, ethyl, n-propyl, i-propyl, butyl, hexyl, cyclohexyl, octyl, decyl and dodecyl, and aryl groups such as phenyl and tolyl. Inter alia, methyl and phenyl are preferred for availability and cost, with methyl being most preferred. The letters x and y are each independently a positive number of at least 1, preferably an integer of 1 to 500, more preferably an integer of 5 to 300, and even more preferably an integer of 10 to 100. The letter z is a positive number from 1 to less than 2, preferably a positive number from 1 to less than 1.5, and most preferably 1. The organohydrogensiloxanes of formula (1) are preferably used for availability and cost because they can be readily synthesized by living polymerization of hexamethylcyclotrisiloxane in the presence of pentacoordinate catalysts or Li catalysts.

Component (B) is used in such an amount as to give 0.1 to 1, preferably 0.2 to 0.9, more preferably 0.3 to 0.8 Si—H group per aliphatic unsaturated group (typically alkenyl) in component (A). Less than 0.1 Si—H group may lead to a low degree of siloxane modification, failing to gain the desired lubricating effect. More than 1 Si—H group may be uneconomical because it means that a fraction of component (B) not contributing to surface lubricity is left unreacted.

Component C

Component (C) is a catalyst for hydrosilylation addition reaction of aliphatic unsaturated groups in component (A) and Si—H groups in component (B). Component (C) is not particularly limited as long as it promotes the addition reaction. Typical are Group VIII metal catalysts (platinum group metal catalysts) including well-known platinum, palladium and rhodium based catalysts. From the aspects of availability and ease of handling, platinum-based addition reaction catalysts are preferably used, for example, platinum, platinum black, chloroplatinic acid, chloroplatinic acid-olefin or aldehyde complex salts, alcohol-modified chloroplatinic acid, and chloroplatinic acid-vinyl siloxane complexes.

The platinum or platinum compound may be used in a catalytic amount, which is typically 1 ppm to 1% by weight of platinum group metal based on the weight of component (A). Preferably the amount of the platinum or platinum compound is determined as appropriate to provide the desired cure rate via addition reaction of components (A) and (B).

In addition to the catalyst (C), an addition crosslinking inhibitor commonly used in curable silicone rubber compositions may be used for the purpose of controlling the cure rate, depending on a particular application. Exemplary inhibitors include ethynyl-cyclohexanol and tetracyclomethylvinylpolysiloxane.

Hydrosilylation addition reaction between components (A) and (B) readily takes place when components (A) and (B) are intimately mixed in the presence of addition reaction catalyst (C) at room temperature or elevated temperature (specifically 0 to 100° C., more specifically 20 to 50° C.). Specifically, Si—H groups in component (B) (typically organohydrogenpolysiloxane having one Si—H group per molecule) react with aliphatic unsaturated groups (for example, alkenyl) in component (A), which reaction is referred to as "hydrosilylation addition reaction," to form an ethylene/α-olefin/nonconjugated polyene random copolymer having organopolysiloxane grafted thereto, i.e., siloxane-modified ethylene/α-olefin/nonconjugated polyene random copolymer.

In addition to the essential components described above, optional components may be added to the rubber composition for the purpose of adjusting cured physical properties, if necessary. Examples include fillers such as fumed silica, precipitated silica, aluminum silicate, quartz powder, fused quartz powder, diatomaceous earth, calcium carbonate, titanium dioxide and carbon black, antidegradants, UV absorbers, and colorants. The filler is preferably added in an amount of up to 500 parts by weight per 100 parts by weight of component (A). A rubber composition containing more than 500 parts by weight of the filler may result in a cured product which is hard and brittle.

The rubber composition of the invention may be prepared by milling predetermined amounts of components (A) to (C) on a two-roll mill, kneader or Banbury mixer. In the milling step, it is effective to add an amount of hydrocarbon-based synthetic oil such as liquid paraffin, LUCANT HC40 (Mitsui Chemicals, Inc.), and Diana Process Oil PW380 (Idemitsu Kosan Co., Ltd). The addition of such oil may reduce the viscosity of the composition to improve its workability.

In addition to the addition reaction catalyst (C) for promoting hydrosilylation addition reaction of components (A) and (B), a vulcanizer or radical-reactive catalyst may be added to the rubber composition for the purpose of promoting cure of the entire composition, if necessary. The vulcanizer is selected from organic peroxides and sulfur. The vulcanizer is desirably used in an amount of up to 10 parts (specifically 0 to 10 parts), more desirably 0.1 to 10 parts, and even more desirably 0.5 to 5 parts by weight per 100 parts by weight of component (A).

The rubber composition thus formulated may be compression molded or steam vulcanized to form a cured polyolefin rubber having improved surface lubricity.

Generally, suitable curing conditions include a temperature of 120 to 200° C. and a time of 3 minutes to 30 minutes for compression molding and a temperature of 140 to 170° C. and a time of 10 minutes to 60 minutes for steam vulcanization. Under such conditions, the polyolefin rubber composition can be efficiently vulcanized, that is, shaped rubber articles can be continuously molded and vulcanized. Where lubricity is needed only on the surface of an article, conventional EPDM rubber and the inventive composition may be extruded in two layers so that the inventive composition becomes the surface layer.

EXAMPLE

Examples and Comparative Examples are given below for further illustrating the invention.

Example 1

In a pressure kneader, 100 parts by weight of ethylene/α-olefin/nonconjugated polyene random copolymer Keltan 2340A (ethylene/propylene/ethylidenenorbornene copolymer, Lanxess AG), 100 parts by weight of carbon black Asahi #60 (Asahi Carbon Co., Ltd.), and 60 parts by weight of Diana Process Oil PW 380 (Idemitsu Kosan Co., Ltd) were milled. Then 5 parts by weight (to provide 0.5 Si—H group per aliphatic unsaturated group in Keltan 2340A) of dimethylpolysiloxane containing a Si—H group at one end and a trimethylsiloxy group at the other end and having a degree of polymerization of 30 and an amount (to provide 5 ppm of platinum based on Keltan 2340A) of chloroplatinic acid/1,3-divinyl-1,1,3,3-tetramethyldisiloxane complex were added and milled. The resulting mixture is designated Composition 1.

Example 2

In a pressure kneader, 100 parts by weight of ethylene/α-olefin/nonconjugated polyene random copolymer Keltan 2340A (Lanxess AG), 100 parts by weight of carbon black Asahi #60 (Asahi Carbon Co., Ltd.), and 60 parts by weight of Diana Process Oil PW 380 (Idemitsu Kosan Co., Ltd) were milled. Then 10 parts by weight (to provide 0.5 Si—H group per aliphatic unsaturated group in Keltan 2340A) of dimethylpolysiloxane containing a Si—H group at one end and a trimethylsiloxy group at the other end and having a degree of polymerization of 60 and an amount (to provide 5 ppm of platinum based on Keltan 2340A) of chloroplatinic acid/1,3-divinyl-1,1,3,3-tetramethyldisiloxane complex were added and milled. The resulting mixture is designated Composition 2.

Example 3

In a pressure kneader, 100 parts by weight of ethylene/α-olefin/nonconjugated polyene random copolymer Vistalon 1703P (ethylene/propylene/ethylidenenorbornene copolymer, Exxon Mobil Corp.), 100 parts by weight of carbon black Asahi #60 (Asahi Carbon Co., Ltd.), and 60 parts by weight of Diana Process Oil PW 380 (Idemitsu Kosan Co., Ltd) were milled. Then 14 parts by weight (to provide 0.5 Si—H group per aliphatic unsaturated group in the Vistalon 1703P) of dimethylpolysiloxane containing a Si—H group at one end and a trimethylsiloxy group at the other end and having a degree of polymerization of 60 and an amount (to provide 5 ppm of platinum based on Keltan 2340A) of chloroplatinic acid/1,3-divinyl-1,1,3,3-tetramethyldisiloxane complex were added and milled. The resulting mixture is designated Composition 3.

Comparative Example 1

In a pressure kneader, 100 parts by weight of ethylene/α-olefin/nonconjugated polyene random copolymer Keltan 2340A (Lanxess AG), 100 parts by weight of carbon black Asahi #60 (Asahi Carbon Co., Ltd.), and 60 parts by weight of Diana Process Oil PW 380 (Idemitsu Kosan Co., Ltd) were milled. Then an amount (to provide 5 ppm of platinum based on Keltan 2340A) of chloroplatinic acid/1,3-divinyl-1,1,3,3-tetramethyldisiloxane complex was added and milled. The resulting mixture is designated Composition 4.

Comparative Example 2

In a pressure kneader, 100 parts by weight of ethylene/α-olefin/nonconjugated polyene random copolymer Keltan 2340A (Lanxess AG), 100 parts by weight of carbon black Asahi #60 (Asahi Carbon Co., Ltd.), and 60 parts by weight of Diana Process Oil PW 380 (Idemitsu Kosan Co., Ltd) were milled. Then 5 parts by weight (to provide 0.5 Si—H group per aliphatic unsaturated group in Keltan 2340A) of dimethylpolysiloxane containing Si—H groups at both ends (i.e., 2 Si—H groups per molecule) and having a degree of polymerization of 60 and an amount (to provide 5 ppm of platinum based on Keltan 2340A) of chloroplatinic acid/1,3-divinyl-1,1,3,3-tetramethyldisiloxane complex were added and milled. During milling, the contents thickened and gelled, failing to obtain the desired composition.

Comparative Example 3

In a pressure kneader, 100 parts by weight of ethylene/α-olefin/nonconjugated polyene random copolymer Keltan 2340A (Lanxess AG), 100 parts by weight of carbon black Asahi #60 (Asahi Carbon Co., Ltd.), and 60 parts by weight of Diana Process Oil PW 380 (Idemitsu Kosan Co., Ltd) were milled. Then 2.5 parts by weight (to provide 0.5 Si—H group per aliphatic unsaturated group in Keltan 2340A) of dimethylpolysiloxane containing trimethylsiloxy groups at both ends and 4 Si—H groups as side chains and having a degree of polymerization of 60 and an amount (to provide 5 ppm of platinum based on Keltan 2340A) of chloroplatinic acid/1,3-divinyl-1,1,3,3-tetramethyldisiloxane complex were added and milled. During milling, the contents thickened and gelled, failing to obtain the desired composition.

Compositions 1 to 4 were tested for friction. A test sheet was prepared by intimately mixing 100 parts by weight of each composition with 2 parts by weight of peroxide vulcanizer C-11A (Shin-Etsu Chemical Co., Ltd.) and press curing at 100 kgf/cm$^2$ and 165° C. for 10 minutes. This was followed by post-curing at 150° C. for 2 hours to form a test sheet. The test sheets were measured for a coefficient of dynamic friction on its surface using a surface property tester HEIDON Type 14FW. The results are shown in Table 1.

TABLE 1

|  |  | Example 1 Composition 1 | Example 2 Composition 2 | Example 3 Composition 3 | Comparative Example 1 Composition 4 |
|---|---|---|---|---|---|
| Coefficient of dynamic friction | As press-cured | 0.16 | 0.18 | 0.15 | 0.53 |
|  | As post-cured | 0.22 | 0.18 | 0.17 | 0.47 |

Japanese Patent Application No. 2013-005335 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:
1. A polyolefin rubber composition comprising
   (A) an ethylene/α-olefin/nonconjugated polyene random copolymer,
   (B) an organohydrogenpolysiloxane containing on average from 1 to less than 1.5 Si—H groups in a molecule, the organohydrogenpolysiloxane being present in such an amount as to provide 0.1 to 1 Si—H group per aliphatic unsaturated group in component (A), and
   (C) a catalytic amount of an addition reaction catalyst.
2. The composition of claim 1 which contains a siloxane-modified ethylene/α-olefin/nonconjugated polyene random copolymer which is formed by intimately mixing the composition to effect hydrosilylation addition reaction between components (A) and (B).
3. The composition of claim 1 wherein component (A) is at least one copolymer selected from ethylene/propylene/5-vinyl-2-norbornene copolymers and ethylene/propylene/ethylidene norbornene copolymers.

4. The composition of claim 1 wherein component (B) is at least one polysiloxane selected from organohydrogenpolysiloxanes of the general formulae (1) and (2):

  (1)

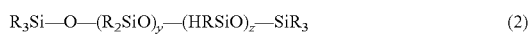  (2)

wherein R is each independently a monovalent aliphatic saturated hydrocarbon group of 1 to 20 carbon atoms or aryl group of 6 to 20 carbon atoms, x and y each are a positive number of at least 1, and z is a positive number which is on average 1.

5. The composition of claim 1 wherein component (C) is a platinum group metal catalyst.

6. The composition of claim 1, further comprising (D) a vulcanizer which is selected from organic peroxides and sulfur.

7. The composition of claim 1, wherein component (B) contains on average one Si—H group in a molecule.

8. A cured polyolefin rubber obtained by curing the polyolefin rubber composition comprising (A) an ethylene/α-olefin/nonconjugated polyene random copolymer, (B) an organohydrogenpolysiloxane containing on average from 1 to less than 1.5 Si—H groups in a molecule, the organohydrogenpolysiloxane being present in such an amount as to provide 0.1 to 1 Si—H group per aliphatic unsaturated group in component (A), and (C) a catalytic amount of an addition reaction catalyst, said cured rubber having a coefficient of dynamic friction of up to 0.3 on its surface.

9. A weatherstrip made of the cured polyolefin rubber of claim 8.

10. A windshield wiper blade made of the cured polyolefin rubber of claim 8.

* * * * *